(12) United States Patent
Shin et al.

(10) Patent No.: US 7,867,430 B2
(45) Date of Patent: Jan. 11, 2011

(54) INJECTION MOLD AND INJECTION MOLDING METHOD USING THE SAME

(75) Inventors: Su-Dong Shin, Cheonan-si (KR); Myoung-Jin Kim, Cheonan-si (KR); Jeong-Hun Heo, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/633,752

(22) Filed: Dec. 8, 2009

(65) Prior Publication Data

US 2010/0295216 A1 Nov. 25, 2010

(30) Foreign Application Priority Data

May 20, 2009 (KR) .................. 10-2009-0044192

(51) Int. Cl.
*B29C 45/22* (2006.01)
(52) U.S. Cl. ................ 264/328.8; 425/564; 425/570; 425/572; 425/DIG. 51
(58) Field of Classification Search ............ 264/328.8; 425/542, 543, 549, 562, 564, 570, 572, DIG. 51
See application file for complete search history.

(56) References Cited

U.S. PATENT DOCUMENTS

| 4,285,659 A | 8/1981 | Koike |
| 4,867,668 A * | 9/1989 | Miyairi .................. 425/192 R |
| 2007/0290119 A1 | 12/2007 | Cerniglia |

FOREIGN PATENT DOCUMENTS

| DE | 2815698 A1 | 10/1979 |
| JP | 59-40195 | 11/1984 |
| JP | 63251215 A | 10/1988 |
| JP | 05-080722 | 4/1993 |
| JP | 05-80722 | 11/1993 |
| JP | 2003-094158 A | 4/2003 |
| JP | 2003-245947 | 9/2003 |
| JP | 2004050822 A | 2/2004 |

(Continued)

OTHER PUBLICATIONS

European Search Report for corresponding EP Application No. 09 01 6009 dated Mar. 22, 2010 (2 pages).

*Primary Examiner*—Jill L Heitbrink
(74) *Attorney, Agent, or Firm*—Innovation Counsel LLP

(57) ABSTRACT

Provided is an injection mold which can reduce the amount of resin that is separated from injection-molded parts and then thrown away. The injection mold includes for an embodiment an extension cylinder coupled to an upper clamp plate and having a nozzle at an end thereof; a nozzle positioner disposed under the nozzle, the nozzle positioner having a nozzle insertion groove adapted to receive the nozzle; a gate-lock-pin holder disposed under the extension cylinder and the nozzle positioner, comprising a gate lock pin which has a first end coupled to a gate molded part and a second end coupled to the gate-lock-pin holder, and adapted to separate the gate molded part from an injection-molded part; a gate stripper plate disposed under the gate-lock-pin holder and adapted to separate the gate molded part from the nozzle; and a cavity plate and a core plate disposed under the gate stripper plate and having a cavity which is shaped like the injection-molded part.

20 Claims, 11 Drawing Sheets

FOREIGN PATENT DOCUMENTS

| | | |
|---|---|---|
| JP | 2005-178232 A | 7/2005 |
| JP | 2006-239863 | 9/2006 |
| KR | 10-2005-0048403 A | 5/2005 |
| KR | 1020050048403 A | 5/2005 |
| WO | 2009072262 A1 | 6/2009 |

* cited by examiner

INJECTION MOLD AND INJECTION MOLDING METHOD USING THE SAME

CROSS-REFERENCE TO RELATED APPLICATIONS

This application claims priority from Korean Patent Application No. 10-2009-0044192 filed on May 20, 2009 in the Korean Intellectual Property Office, the disclosure of which is incorporated herein by reference in its entirety.

BACKGROUND

1. Technical Field

Embodiments of the present invention relate to an injection mold and an injection molding method using the same.

2. Description of the Related Art

A conventional injection mold that may be used to produce plastic molded parts may include a cavity plate and a core plate having cavities. There are generally two main types of conventional injection molds. One is a two-plate injection mold, and the other is a three-plate injection mold.

A two-plate injection mold has a parting plane positioned between a cavity plate and a core plate. When the injection mold is opened, injection-molded parts may be removed therefrom. However, gate molded parts, formed by resin that hardens in gates of a conventional mold, are also attached to injection-molded parts that are removed from the two-plate injection mold. Thus, an additional process is required to separate the gate molded parts from the injection-molded parts.

Unlike a two-plate injection mold, a three-plate injection mold includes a stripper plate disposed between a cavity plate and an upper clamp plate. The stripper plate causes the three-plate injection mold to have two parting planes. Thus, gate molded parts can be separated from injection-molded parts within the three-plate injection mold. Accordingly, pinpoint gates can be used in a three-plate injection mold.

Since a two-plate injection mold has a simple structure, it can use extension cylinders. Extension cylinders extend into a two-plate injection mold, and molten resin that is injected into the two-plate injection mold flows through the extension cylinders while being kept in a molten state. Unlike a two-plate injection mold, a three-plate injection mold further includes lock pins coupled to an upper clamp plate and a stripper plate disposed under the upper clamp plate. A three-plate injection mold has a more complex structure than a two-plate injection mold, and thus it is difficult to install extension cylinders within the three-plate injection mold. Accordingly, resin that is fed into a three-plate injection mold hardens as it flows through runners within the three-plate injection mold. Generally, a large amount of hardened resin is formed when a three-plate injection mold is used, and this hardened resin is then usually thrown away as waste.

Currently, three-plate injection molds having pinpoint gates are being used to produce light-emitting diode (LED) lead frames. However, as described above, since conventional three-plate injection molds cannot have extension cylinders therein, a large amount of resin is thrown away. The amount of resin that is thrown away accounts for 90% or more of the total amount of resin that is injected into a three-plate injection mold to produce lead frames.

SUMMARY

Embodiments of the present invention provide an injection mold and a molding method which may minimize the amount of hardened resin that is thrown away. For example, an injection mold may use pinpoint gates to produce a light-emitting diode (LED) lead frame.

However, embodiments of the present invention are not restricted to the embodiments set forth herein. Aspects of the present disclosure will become more apparent to one of ordinary skill in the art to which the embodiments of the present invention pertains by referencing the detailed description of the embodiments of the present invention given below.

According to an embodiment of the present invention, there is provided an injection mold that includes an extension cylinder installed within an upper clamp plate and having a nozzle at an end thereof and a nozzle position holder having a nozzle insertion groove adapted to receive the nozzle. A gate-lock-pin holder is disposed under the extension cylinder and the nozzle position holder, including a gate lock pin which has a first end coupled to a gate molded part and a second end coupled to the gate-lock-pin holder. A gate stripper plate is disposed under the gate-lock-pin holder. Finally, an object mold comprising a cavity plate and a core plate disposed under the gate stripper plate. The cavity plate and the core plate collectively form a cavity having a shape of an injection-molded part inside the cavity plate and the core plate.

According to another embodiment of the present invention, there is provided an injection molding method that includes supplying molten resin into an extension cylinder which is installed within an injection mold that includes a nozzle that is adapted to be inserted into a nozzle position holder. The method further includes separating a gate molded part from an injection-molded part by separating a cavity plate of an object mold which comprises the cavity plate and a core plate, the cavity plate and the core plate collectively forming a cavity having a shape of the injection-molded part inside the cavity plate and the core plate, from a gate-lock-pin holder comprising a gate lock pin, which is interposed between the cavity plate and the nozzle position holder and a gate stripper plate which is disposed under the gate-lock-pin holder. Further, the method includes separating the gate molded part from the gate lock pin by separating the gate stripper plate from the gate-lock-pin holder, and separating the cavity plate from a core plate disposed under the cavity plate.

BRIEF DESCRIPTION OF THE DRAWINGS

The above and other embodiments of the present invention will become more apparent by describing in detail exemplary embodiments thereof with reference to the attached drawings, in which.

DETAILED DESCRIPTION

Figure 1:
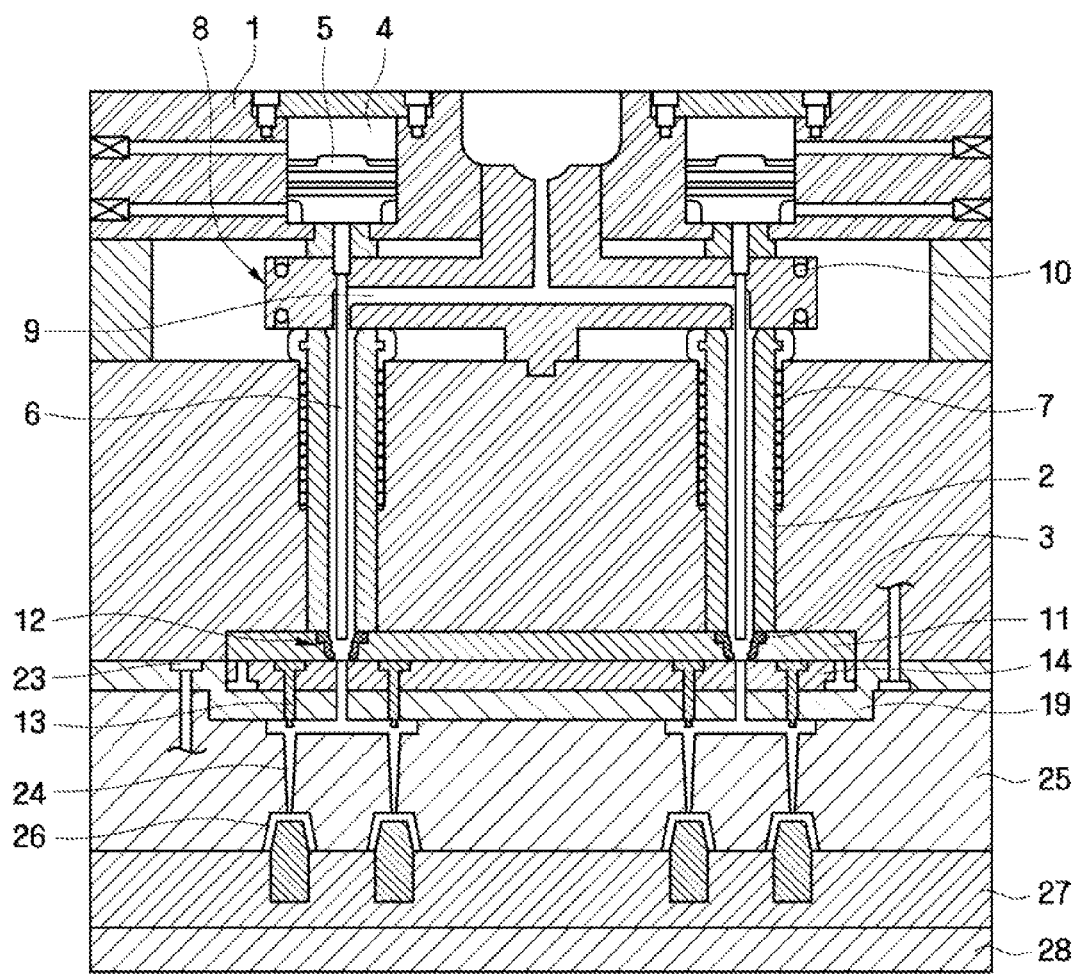
FIG. 1 is a schematic cross-sectional view of an injection mold according to an exemplary embodiment of the present invention.

Advantages and features of embodiments of the present invention and methods of accomplishing the same may be understood more readily by reference to the following detailed description of exemplary embodiments and the accompanying drawings. Embodiments of the present invention may, however, be embodied in many different forms and the scope of the present disclosure should not be construed as being limited to the embodiments set forth herein. Rather, these embodiments are provided so that this disclosure will be thorough and complete and will fully convey the concept of the present disclosure to those skilled in the art, and the embodiments of the present invention will only be defined by the appended claims. In some embodiments, conventional processes, conventional structures and conventional technologies will not be specifically described. The same reference numerals will be used to refer to identical elements throughout the specification.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" or "beneath" can encompass both an orientation of above and below or beneath. The device may be otherwise oriented and the spatially relative descriptors used herein interpreted accordingly.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which embodiments of the present invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an injection mold according to an exemplary embodiment of the present invention will be described in detail with reference to FIGS. 1 through 6E.

FIG. 1 is a schematic cross-sectional view of an injection mold according to an exemplary embodiment of the present invention. The injection mold shown in FIG. 1 is closed. FIGS. 2 through 6E are perspective and cross-sectional views of an extension cylinder, a nozzle position holder, a gate lock pin, gate-lock-pin holders, and gate stripper plates according to exemplary embodiments of the present invention.

Referring to FIG. 1, extension cylinders 2, each having a nozzle 3 at an end thereof, are coupled to an upper clamp plate 1 which is an upper base panel. The extension cylinders 2 are cylinders which extend into the injection mold to supply molten resin into the injection mold.

Figure 2:
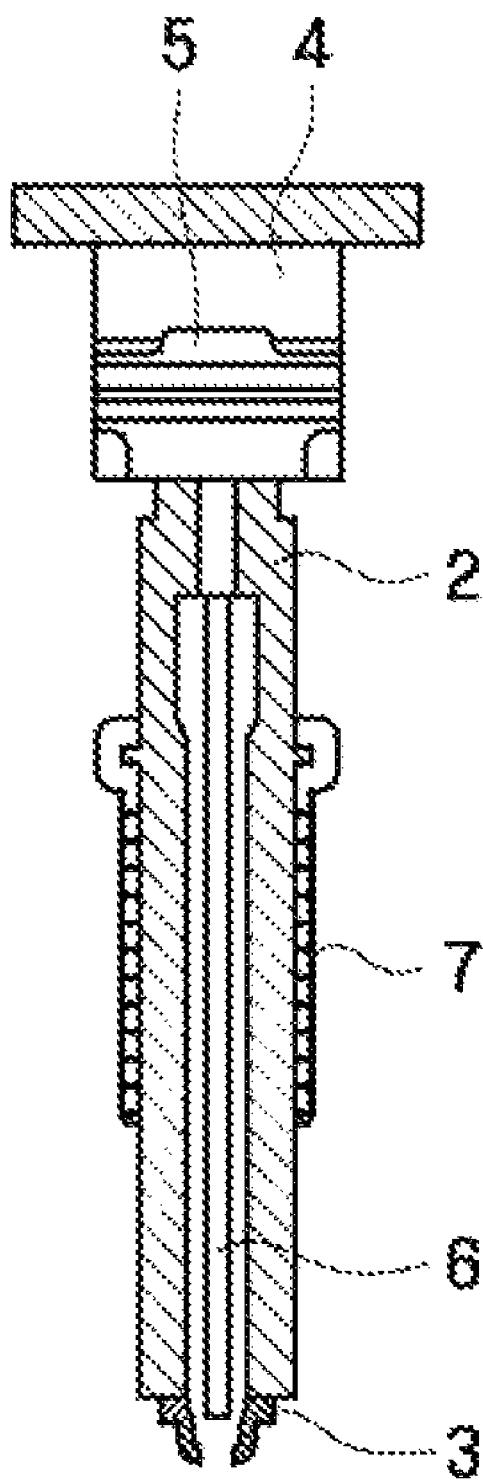
FIG. 2 is a cross-sectional view of an extension cylinder according to an exemplary embodiment of the present invention.

Referring to FIGS. 1 and 2, each of the extension cylinders 2 includes a melting cylinder 4 which is installed within the upper clamp plate 1 and the nozzle 3 which is fluidly coupled to an end of the melting cylinder 4. The melting cylinder 4 includes a piston 5 that has a valve pin 6 coupled thereto. As the piston 5 inside the melting cylinder 4 ascends and descends, the valve pin 6 coupled to the piston 5 also ascends and descends. That is, the valve pin 6 opens or closes an inlet of the nozzle 3 in accordance with the up or down movement of the piston 5, thereby controlling the amount of resin ejected from the nozzle 3. When the melting cylinder 4 completely descends, the valve pin 6 blocks the ejection of resin from the nozzle 3. The nozzle 3 may be made of metal.

In the current exemplary embodiment, each of the extension cylinders 2 includes a heater 7 that is adapted to keep resin inside the extension cylinders 2 in a molten state. The heater 7 may be implemented as a coil wound around an outer circumferential surface of each of the extension cylinders 2. In the current exemplary embodiment, since resin is kept in a molten state within the extension cylinders 2, it is not hardened into a shape within the extension cylinders 2. Therefore, the amount of waste resin that is thrown away can be significantly reduced.

Figure 3:
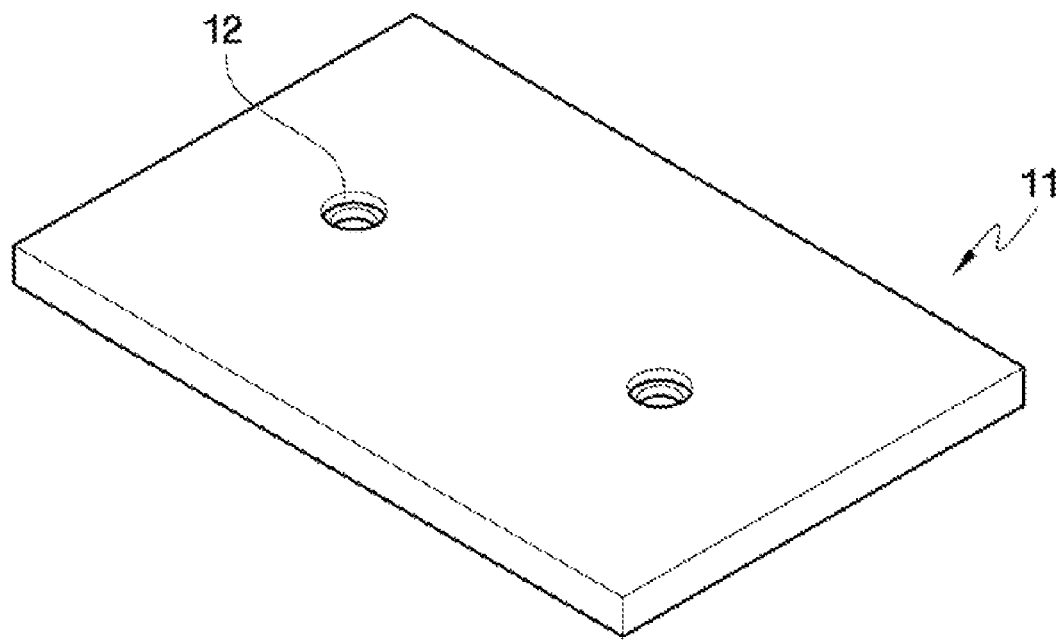
FIG. 3 is a perspective view of a nozzle position holder according to an exemplary embodiment of the present invention.

Referring to FIGS. 1 and 3, the nozzle 3 is inserted into a nozzle insertion groove 12 formed in a nozzle position holder 11. Each of the nozzle insertion grooves 12 guides the position of the nozzle 3 which is coupled to an end of each of the extension cylinders 2. The nozzle insertion grooves 12 may be sized such that minimal or no space is created between the nozzle insertion groove 12 and the nozzle 3 when the nozzle 3 is inserted into the nozzle insertion grooves 12. The space, if present, between each of the nozzle insertion grooves 12 and the respective nozzle 3 may be filled with resin, thereby insulating the periphery of the nozzle 3.

As described above, the nozzle insertion grooves 12 can guide the position of the nozzle 3. In addition, since each of the nozzle insertion grooves 12 surrounds the nozzle 3, molten resin can be prevented from being injected into portions of the injection mold other than a predetermined position. Also, the nozzle position holder 11 may be adapted to include a heater that is adapted to prevent molten resin from hardening at the inlet of the nozzle 3. For example, the heater may be adapted to keep the nozzle position holder 11 at a temperature of approximately 130 to 150 degrees Celsius.

Figure 4:
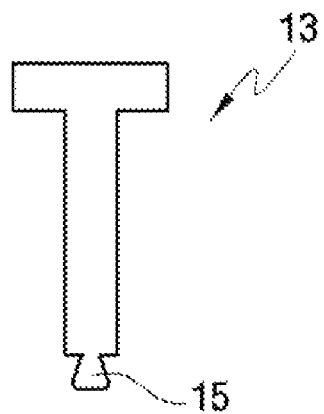
FIG. 4 is a cross-sectional view of a gate lock pin according to an exemplary embodiment of the present invention.

Referring to FIGS. 1 and 4, gate lock pins 13 are coupled to a gate-lock-pin holder 14 that is in turn coupled to the underside of the nozzle position holder 11. An undercut protrusion 15 is formed at an end of each of the gate lock pins 13.

Figure 5A:
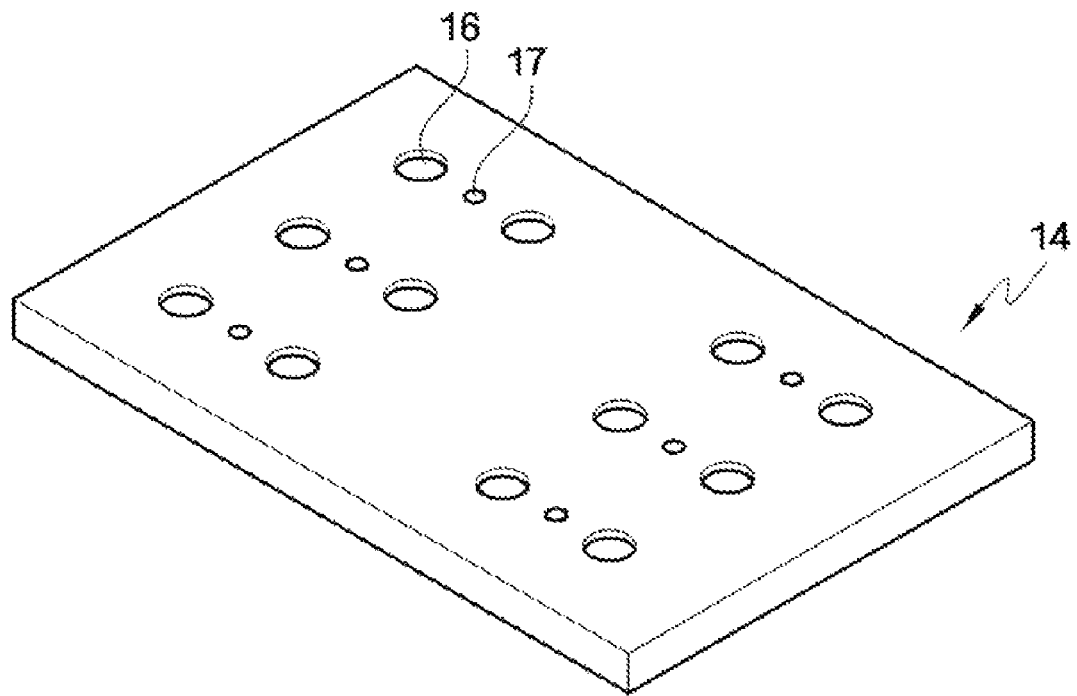
FIGS. 5A and 5B are cross-sectional views of gate-lock-pin holders according to exemplary embodiments of the present invention.

Referring to FIG. 5A, in an exemplary embodiment, the gate-lock-pin holder 14 is a quadrangle plate. The gate-lock-pin holder 14 includes holes 16 through which the gate lock pins 13 may pass, and holes 17 through which resin may be injected.

Figure 5B:
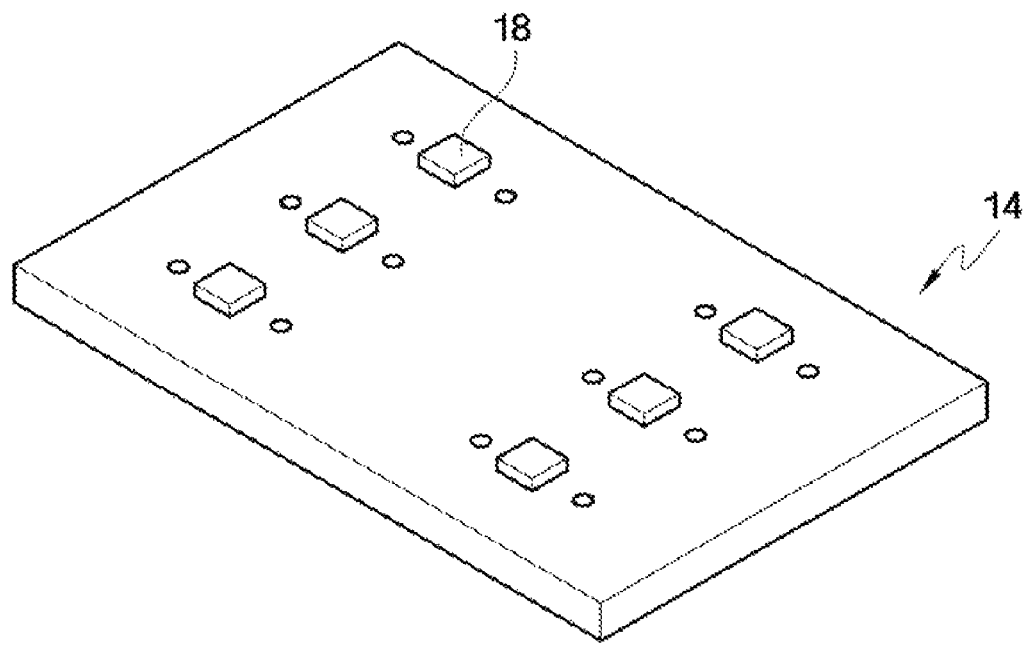

FIG. 5B shows another exemplary embodiment of the gate-lock-pin holder 14. In this exemplary embodiment, a lower surface of a gate-lock-pin holder 14, that is, a surface that faces a gate stripper plate 19, is shown. A plurality of protrusions 18 are formed on the lower surface of the gate-lock-pin holder 14. Grooves are formed in the gate stripper plate 19 to be removably coupled to the protrusions 18. The gate-lockpin holder 14 may be positioned on the gate stripper plate 19 by inserting the protrusions 18 into the grooves of the gate stripper plate 19. The gate-lock-pin holder 14 may have various forms other than the above exemplary embodiments.

The gate-lock-pin holder 14 having the gate lock pins 13 coupled thereto is disposed directly under the nozzle position holder 11 such that no intervening layer or element is present between the gate-lock-pin holder 14 and the nozzle position holder 11.

The gate stripper plate 19 is disposed under the gate-lock-pin holder 14, and puller pins 23 are adapted to be removably coupled to the gate stripper plate 19. The gate stripper plate 19 may be adapted to separate from the gate-lock-pin holder 14 by pulling the puller pins 23.

Figure 6A:
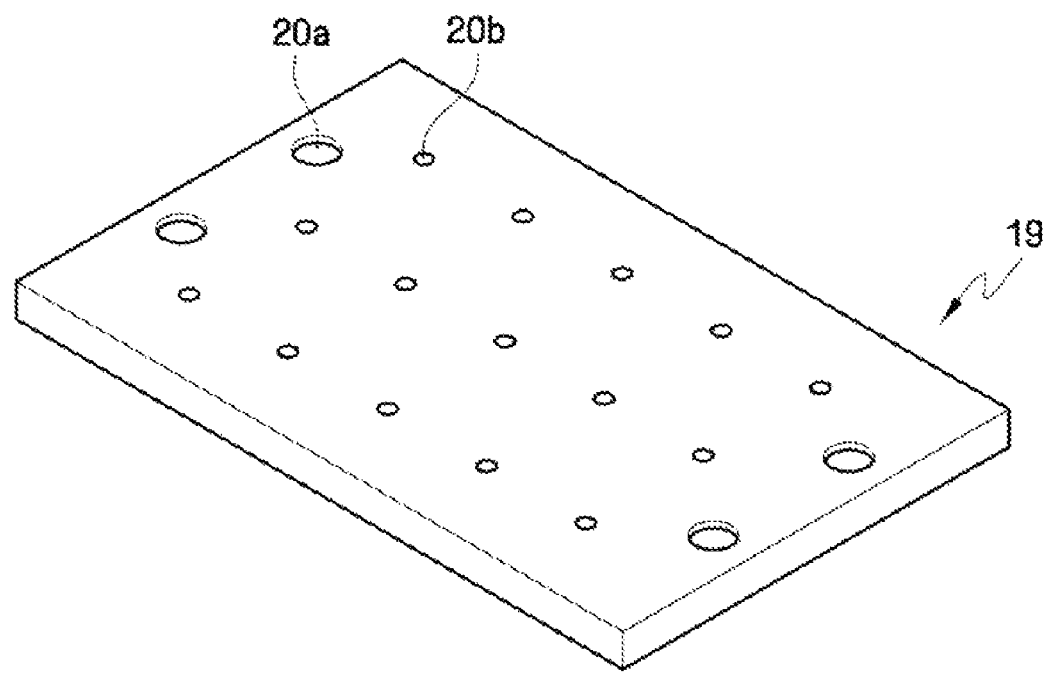
FIGS. 6A through 6E are cross-sectional views of gate stripper plates according to exemplary embodiments of the present invention.
Figure 6B:
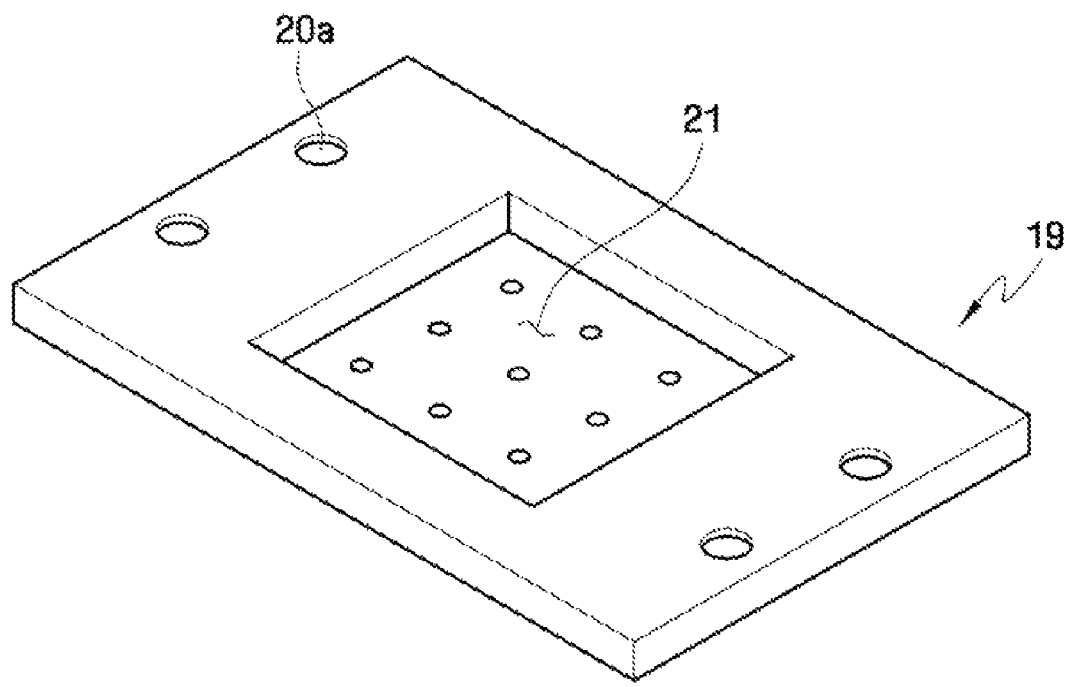

FIGS. 6A through 6E are perspective views of various exemplary embodiments of the gate stripper plate 19 shown in FIG. 1. Referring to FIG. 6A, an exemplary embodiment of a gate stripper plate 19 is a flat quadrangle plate having a flat upper surface. That is, the gate stripper plate 19 shown in FIG. 6A may be a flat plate without a recessed portion. A plurality of holes 20a through which the puller pins 23 pass, and a plurality of holes 20b through which the gate lock pins 13 and molten resin pass, are formed in the gate stripper plate 19. Referring to FIG. 6B, another exemplary embodiment of a gate stripper plate 19 has a recessed portion 21 on which the gate-lock-pin holder 14 is mounted. In this exemplary embodiment, since the gate-lock-pin holder 14 is mounted on the recessed portion 21, the length of the gate lock pins 13 can be reduced. Thus, it may be desirable in certain embodiments of the injection mold for the gate stripper plate 19 to have the recessed portion 21.

Figure 6C:
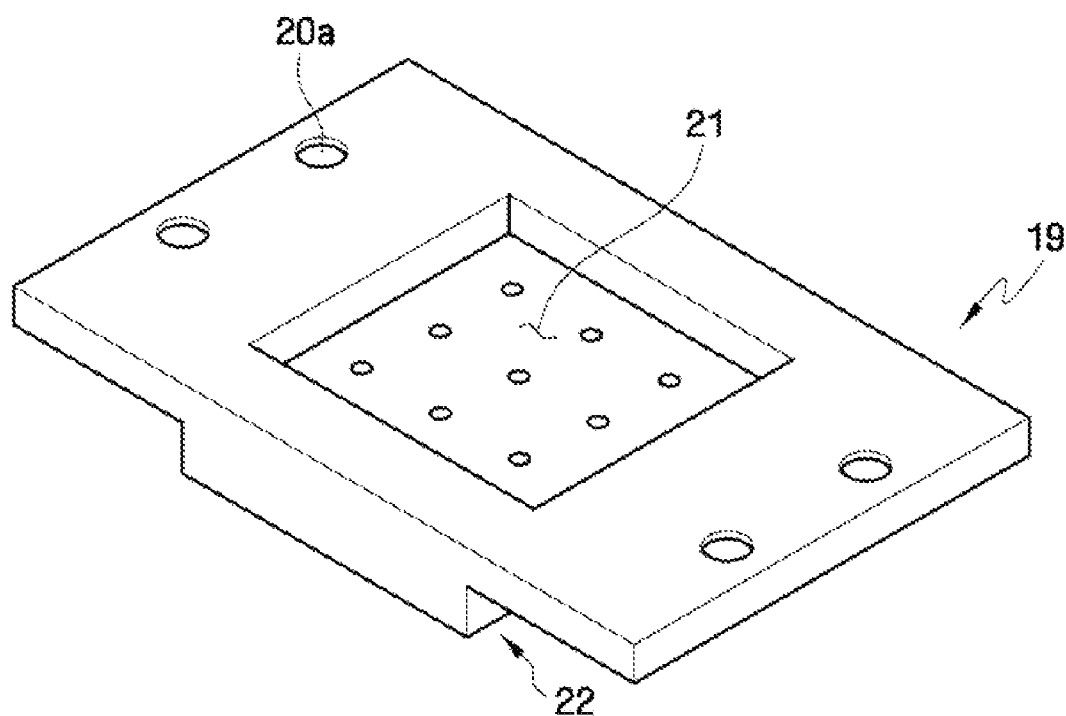
Figure 6D:
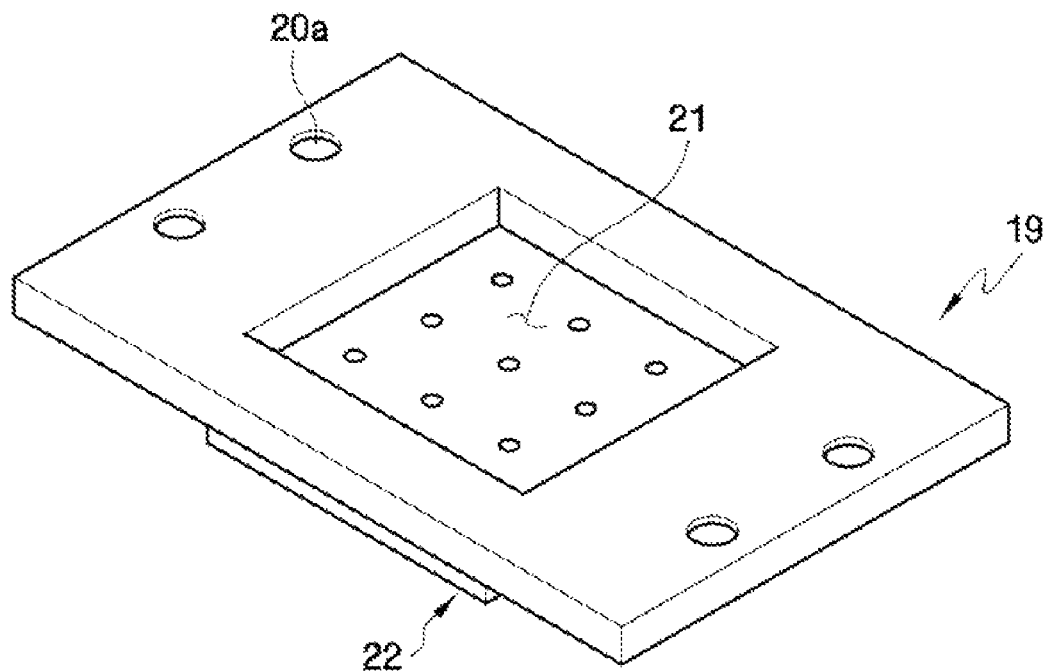
Figure 6E:
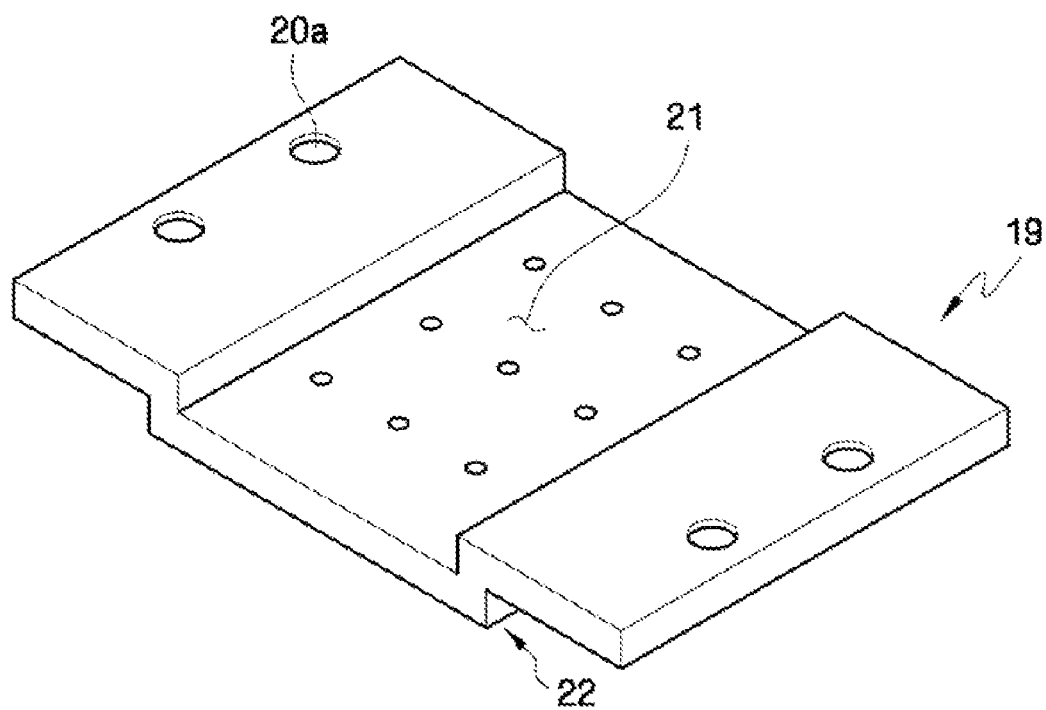

Referring to FIG. 6C, in another exemplary embodiment, indented portions 22 are formed on opposing side surfaces of the gate stripper plate 19 such that the opposing side surfaces of the gate stripper plate 19 are stepped. Referring to FIG. 6D, in yet another exemplary embodiment, indented portions 22 may be formed respectively on four side surfaces of a gate stripper plate 19 such that all of the four side surfaces are stepped. In this embodiment, the gate stripper plate 19 is shaped like a quadrangle having wings at four sides thereof. The embodiments of gate stripper plates 19 shown in FIGS. 6C and 6D maintain a rigidity balance between the recessed portion 21 and other portions thereof, and reinforce the rigidity of parts that are coupled thereto. Referring to FIG. 6E, the recessed portion 21, which accommodates the gate-lock-pin holder 14, may extend to two sides of the gate stripper plate 19.

Referring back to FIG. 1, a cavity plate 25 is disposed under the gate stripper plate 19. Gates 24 are formed in the cavity plate 25, and resin flows through the gates 24 to be injected into the cavities 26 formed in the cavity plate 25. These cavities 26 are filled with molten resin which hardens to produce molded parts. That is, resin is injected into each of the cavities 26 and molded into the shape of the cavities 26. Each of the gates 24 may be a pinpoint gate having a pinpoint-shaped end that is fluidly coupled to a corresponding one of the cavities 26. A core plate 27 is disposed under the cavity plate 25. The cavity plate 25 and the core plate 27 constitute an object mold. A lower clamp plate 28, which is a lower base panel, is disposed under the core plate 27.

FIGS. 7 through 10 are cross-sectional views illustrating an injection mold according to an exemplary embodiment of the present invention during various stages of operation.

Figure 7:
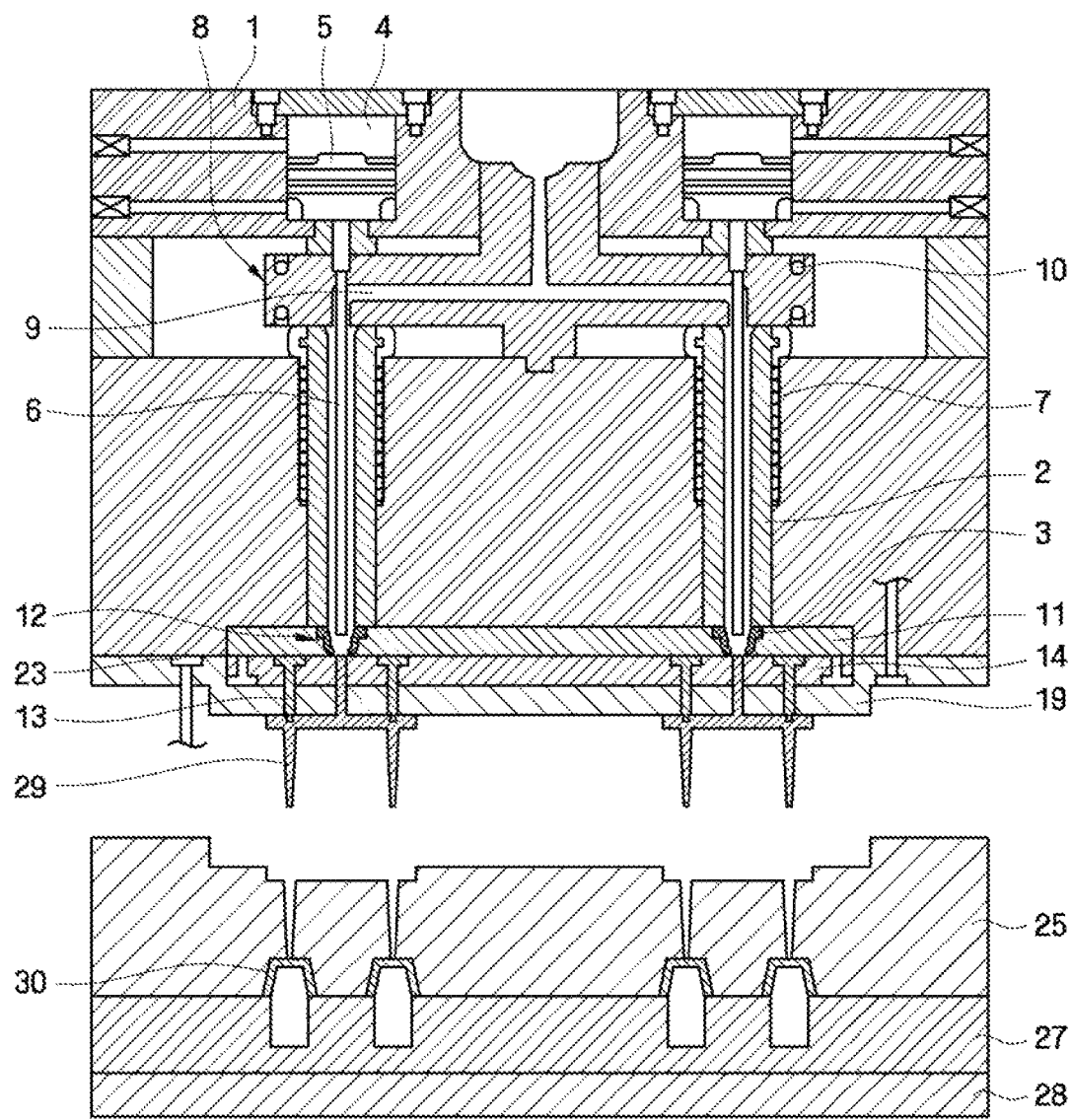
FIGS. 7 through 10 are cross-sectional views illustrating an injection mold according to an exemplary embodiment of the present invention during various stages of operation.

Referring to FIGS. 1 and 7, when the injection mold is closed as shown in FIG. 1, molten resin that has been injected into the injection mold flows through each of the extension cylinders 2 to arrive at the inlet of the nozzle 3. The molten resin that is injected from the inlet of the nozzle 3 enters each of the cavities 26 through a corresponding one of the gates 24. Then, the molten resin hardens to the shape of the cavities 26, thereby producing the injection-molded parts 30. The molten resin within the gates 24 also hardens to produce the gate molded parts 29. The resin is maintained in a molten state within the extension cylinders 2 by the heaters 7. Since resin does not harden within the extension cylinders 2, the amount of resin that is thrown away can be significantly reduced.

A first end of each of the gate lock pins 13 is coupled to a corresponding one of gate molded parts 29, and a second end of each of the gate lock pins 13 is coupled to the gate-lock-pin holder 14. Referring to FIGS. 4 and 7, when the injection mold is opened by separating the gate stripper plate 19 and the cavity plate 25, the gate molded parts 29 are separated from injection-molded parts 30 since the gate molded parts 29 are formed on the gate lock pins 13, and the undercut protrusion 15 that is at an end of each of the gate lock pins 13 is adapted to be coupled to a corresponding one of the gate molded parts 29 once the molten resin hardens.

Referring to FIG. 7, after the gate molded parts 29 and the injection-molded parts 30 are formed by the hardened resin, the cavity plate 25 is separated from the gate-lock-pin holder 14 and the gate stripper plate 19. The cavity plate 25 may be separated from the gate stripper plate 19 by approximately 60 mm. Since the gate molded parts 29 are coupled to the gate lock pins 13, they are separated from the injection molded parts 30.

Figure 8:
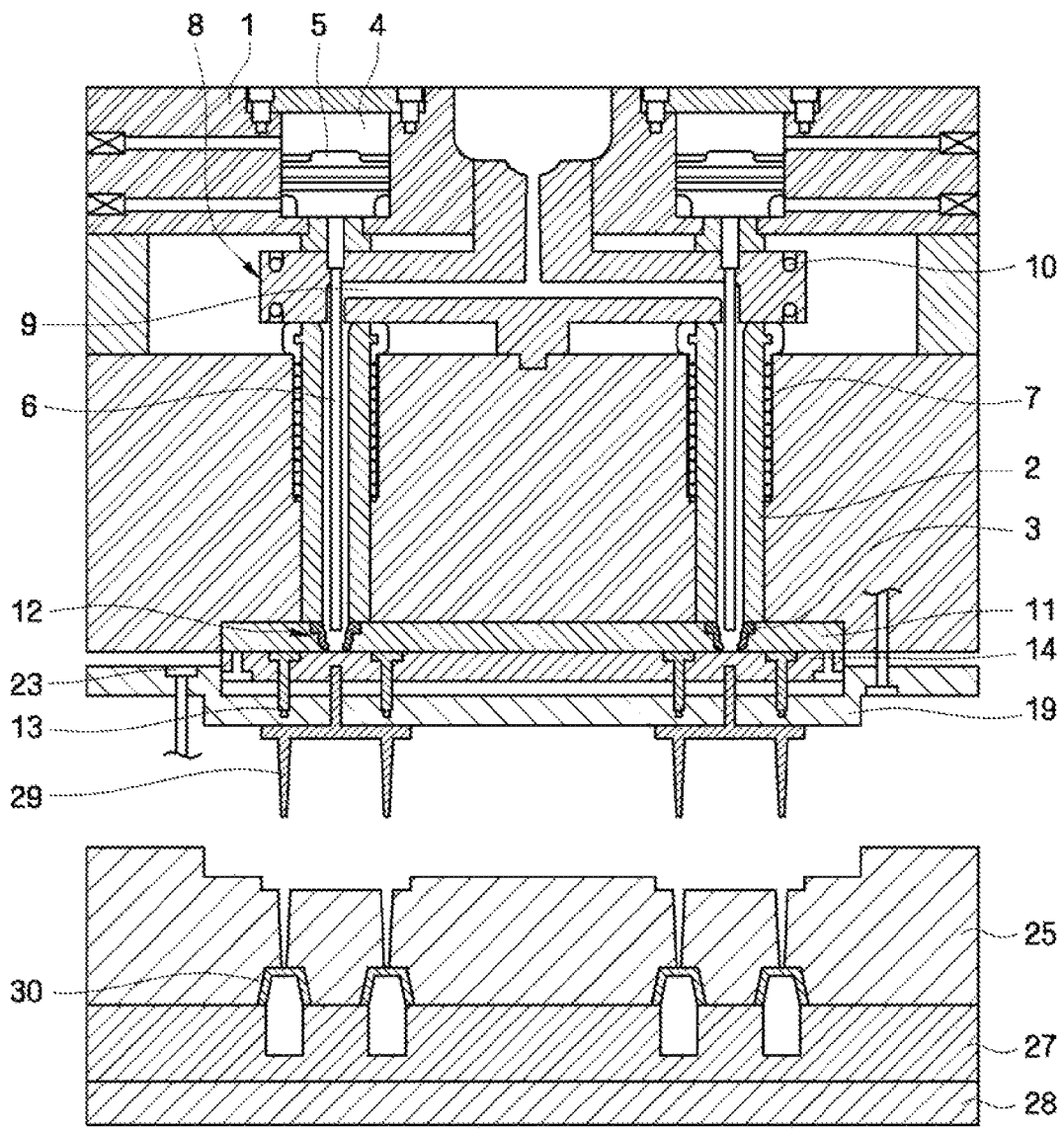

Referring to FIG. 8, the gate stripper plate 19 is separated from the gate-lock-pin holder 14 by pulling the puller pins 23 that are coupled to the gate stripper plate 19. The gate stripper plate 19 may be separated from the gate-lock-pin holder 14 by approximately 3 to 5 mm. The gate molded parts 29 coupled to the gate lock pins 13 are then separated from the gate lock pins 13.

Figure 9:
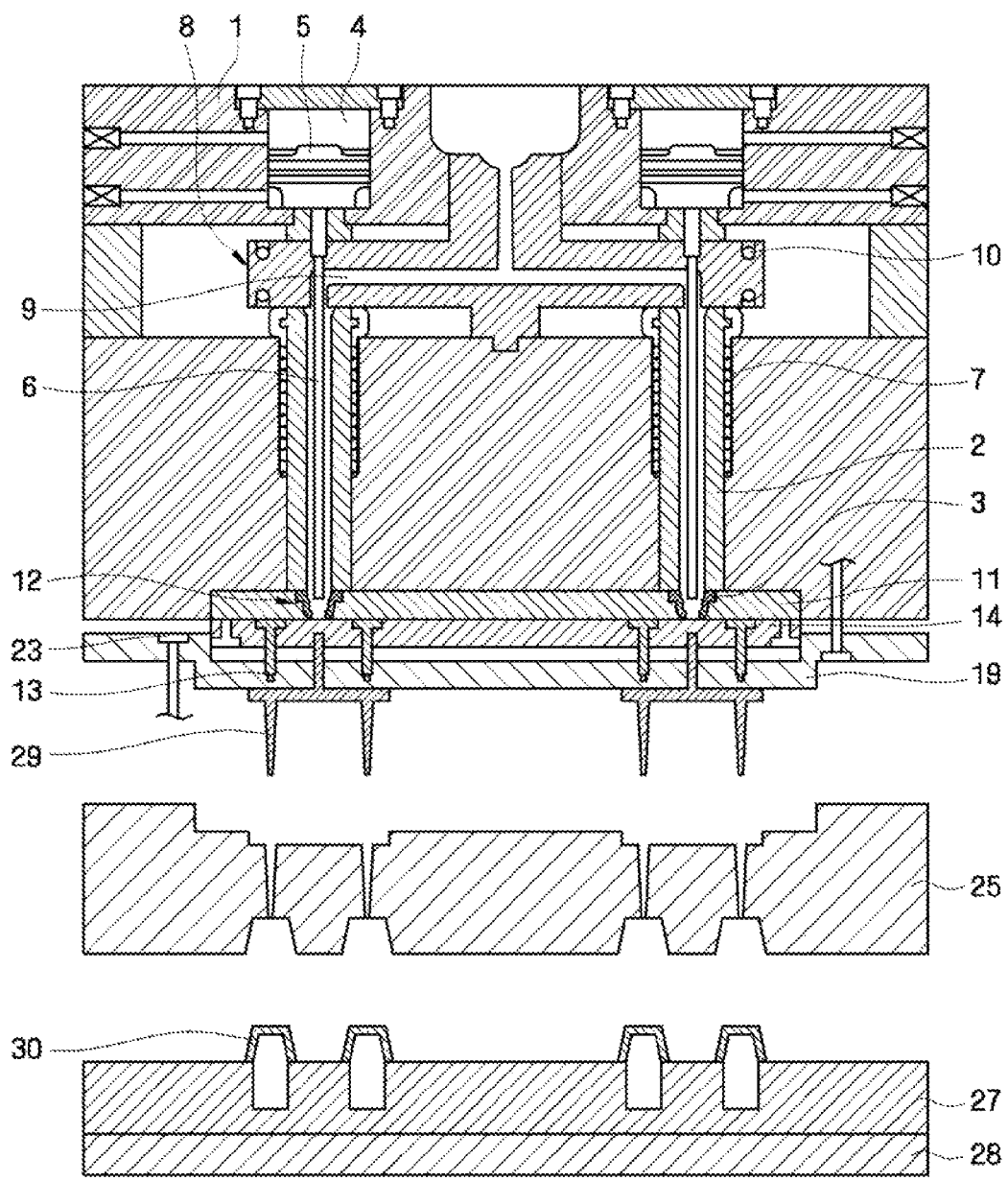
Figure 10:
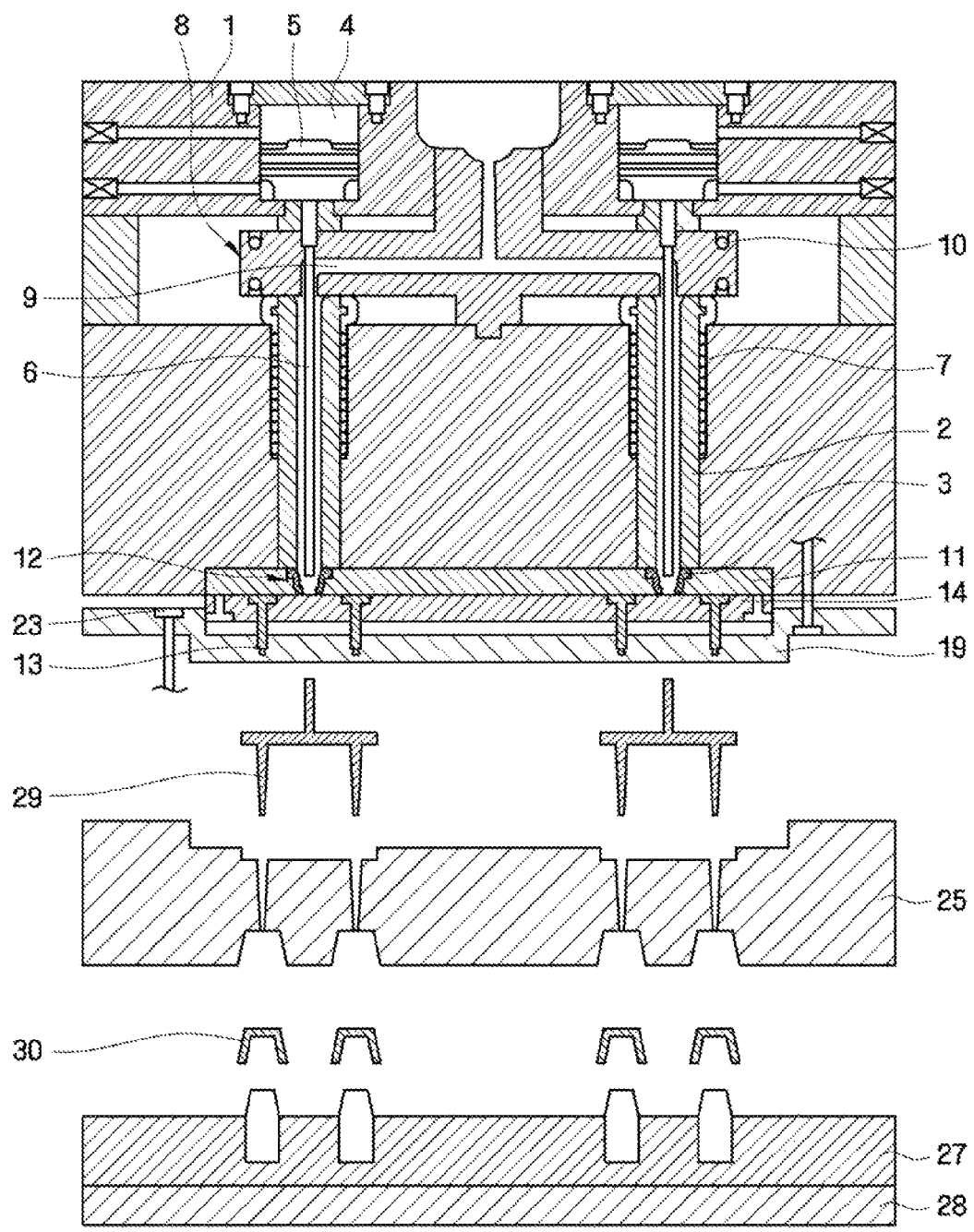

Referring to FIG. 9, the core plate 27 is shown to be separated from the cavity plate 25. As shown in FIG. 9, the injection-molded parts 30 are formed from the hardened resin on the core plate 27. Referring to FIG. 10, the gate molded parts 29 and the injection-molded parts 30 are transferred out of the injection mold by using an ejector.

Runner lock pins, which are coupled to an upper clamp plate of a conventional injection mold, are not necessary in an injection mold according to the exemplary embodiments described herein. The absence of runner lock pins means the extension cylinders 2 can be disposed under the upper clamp plate 1. Since the extension cylinders 2 and the heaters 7 prevent the resin from hardening when the resin passes through the upper clamp plate 1, the amount of resin that is thrown away can be significantly reduced. In addition, in an injection mold according to the current exemplary embodiment, the gate-lock-pin holder 14, the gate lock pins 13, and the gate stripper plate 19 are disposed between the nozzle 3 and the cavity plate 25. Therefore, the gate molded parts 29 can be separated from the injection molded parts 30 according to the current exemplary embodiment.

In a conventional three-plate injection mold, runner lock pins are coupled to an upper clamp plate. The upper clamp plate of a conventional three-plate injection mold is thick because it includes a sprue bush and other elements. Therefore, conventional lock pins are formed to a length of approximately 65 to 80 mm or greater. However, in an injection mold according to the exemplary embodiments described herein, lock pins are not coupled to the upper clamp plate 10, and the separate gate-lock-pin holder 14 is disposed under the nozzle 3 of each of the extension cylinders 2. In addition, an end of each of the gate lock pins 13 is coupled to the gate-lock-pin holder 14. Thus, the length of the gate lock pins 13 can be reduced. Moreover, the recessed portion 21 is formed in the gate stripper plate 19, and the gate-lock-pin holder 14 is placed on the recessed portion 21. Thus, the length of the gate lock pins 13 can further be reduced. According to the exemplary embodiments described herein, the length of the gate lock pins 13 may be reduced to approximately 15 mm or less. When the length of the gate lock pins 13 is reduced as described above, the distance by which the injection mold is opened can be greatly reduced.

An injection mold according to the exemplary embodiment described herein is especially useful for an injection mold using pinpoint gates. For example, an injection mold according to the exemplary embodiments described herein is useful for producing light-emitting diode (LED) lead frames.

While the embodiments of the present invention have been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. An injection mold comprising:
   an upper clamp plate;
   an extension cylinder installed within the injection mold and having opposite first and second ends and a nozzle extending from the second end, wherein the first end of the extension cylinder is coupled to the upper clamp plate and the second end extends through the upper clamp plate;
   a nozzle position holder positioned under the upper clamp plate and having a nozzle insertion groove adapted to receive the nozzle;
   a gate-lock-pin holder disposed under the nozzle of the extension cylinder and the nozzle position holder, comprising a gate lock pin which has a first end coupled to a gate molded part and a second end coupled to the gate-lock-pin holder, and separating the gate molded part from an injection-molded part;
   a gate stripper plate disposed under the gate-lock-pin holder and separating the gate molded part from the nozzle; and
   an object mold comprising a cavity plate and a core plate disposed under the gate stripper plate, wherein the cavity plate and the core plate collectively form a cavity having a shape of an injection-molded part inside the cavity plate and the core plate.

2. The injection mold of claim 1, wherein the gate stripper plate comprises a recessed portion accommodating the gate-lock-pin holder.

3. The injection mold of claim 2, wherein the gate stripper plate has indented portions on at least two sides thereof.

4. The injection mold of claim 1, wherein the gate stripper plate is a flat plate having a flat upper surface.

5. The injection mold of claim 1, wherein the extension cylinder comprises a melting cylinder.

6. The injection mold of claim 5, wherein the melting cylinder comprises a piston and a valve pin which is coupled to the piston and adapted to control an amount of resin ejected from the nozzle.

7. The injection mold of claim 5, wherein the extension cylinder comprises a heater.

8. The injection mold of claim 1, wherein the gate stripper plate comprises a puller pin which is adapted to be pulled to separate the gate-lock-pin holder from the gate stripper plate.

9. The injection mold of claim 1, wherein the gate stripper plate is disposed directly under the gate-lock-pin holder.

10. The injection mold of claim 9, wherein the gate-lock-pin-holder is disposed directly under the nozzle position holder.

11. The injection mold of claim 1, wherein an end of a gate which contacts the cavity is pinpoint-shaped.

12. An injection molding method comprising:
    supplying molten resin into an extension cylinder which is installed within an injection mold and comprises opposite first and second ends and a nozzle extending from the second end, wherein the first end of the extension cylinder is coupled to an upper clamp plate and the second end extends through the upper clamp plate, and wherein the nozzle is adapted to be inserted into a nozzle position holder that is positioned under the upper clamp plate;
    separating a gate molded part from an injection-molded part by separating a cavity plate of an object mold which comprises the cavity plate and a core plate disposed under, the cavity plate and the core plate collectively forming a cavity having a shape of the injection-molded part inside the cavity plate and the core plate, from a gate-lock-pin holder disposed under the nozzle and comprising a gate lock pin, which is interposed between the cavity plate and the nozzle position holder, and a gate stripper plate which is disposed under the gate-lock-pin-holder;
    separating the gate molded part from the gate lock pin by separating the gate stripper plate from the gate-lock-pin holder; and
    separating the cavity plate from the core plate disposed under the cavity plate.

13. The injection molding method of claim 12, wherein a recessed portion is formed in the gate stripper plate to accommodate the gate-lock-pin holder.

14. The injection molding method of claim 13, wherein the gate stripper plate has indented portions on at least two sides thereof.

15. The injection molding method of claim 12, wherein the extension cylinder comprises a melting cylinder.

16. The injection molding method of claim 15, wherein the melting cylinder comprises a piston and a valve pin which is coupled to the piston and is adapted to control an amount of resin ejected from the nozzle.

17. The injection molding method of claim 16, wherein the extension cylinder comprises a heater.

18. The injection molding method of claim 12, wherein the gate stripper plate is disposed directly under the gate-lock-pin holder.

19. The injection molding method of claim 18, wherein the gate-lock-pin holder is disposed directly under the nozzle position holder.

20. The injection molding method of claim 12, wherein an end of a gate which contacts the cavity is pinpoint-shaped.

* * * * *